Jan. 21, 1941.    J. C. TRAVILLA, JR    2,229,429
RAILWAY TRUCK STRUCTURE
Filed Oct. 15, 1938    3 Sheets-Sheet 1

INVENTOR
JAMES C TRAVILLA JR.
BY Rodney Bedell
ATTORNEY

Jan. 21, 1941.    J. C. TRAVILLA, JR    2,229,429
RAILWAY TRUCK STRUCTURE
Filed Oct. 15, 1938    3 Sheets-Sheet 2

INVENTOR
JAMES C. TRAVILLA JR
BY Rodney Bedell
ATTORNEY

Jan. 21, 1941.  J. C. TRAVILLA, JR  2,229,429
RAILWAY TRUCK STRUCTURE
Filed Oct. 15, 1938  3 Sheets-Sheet 3
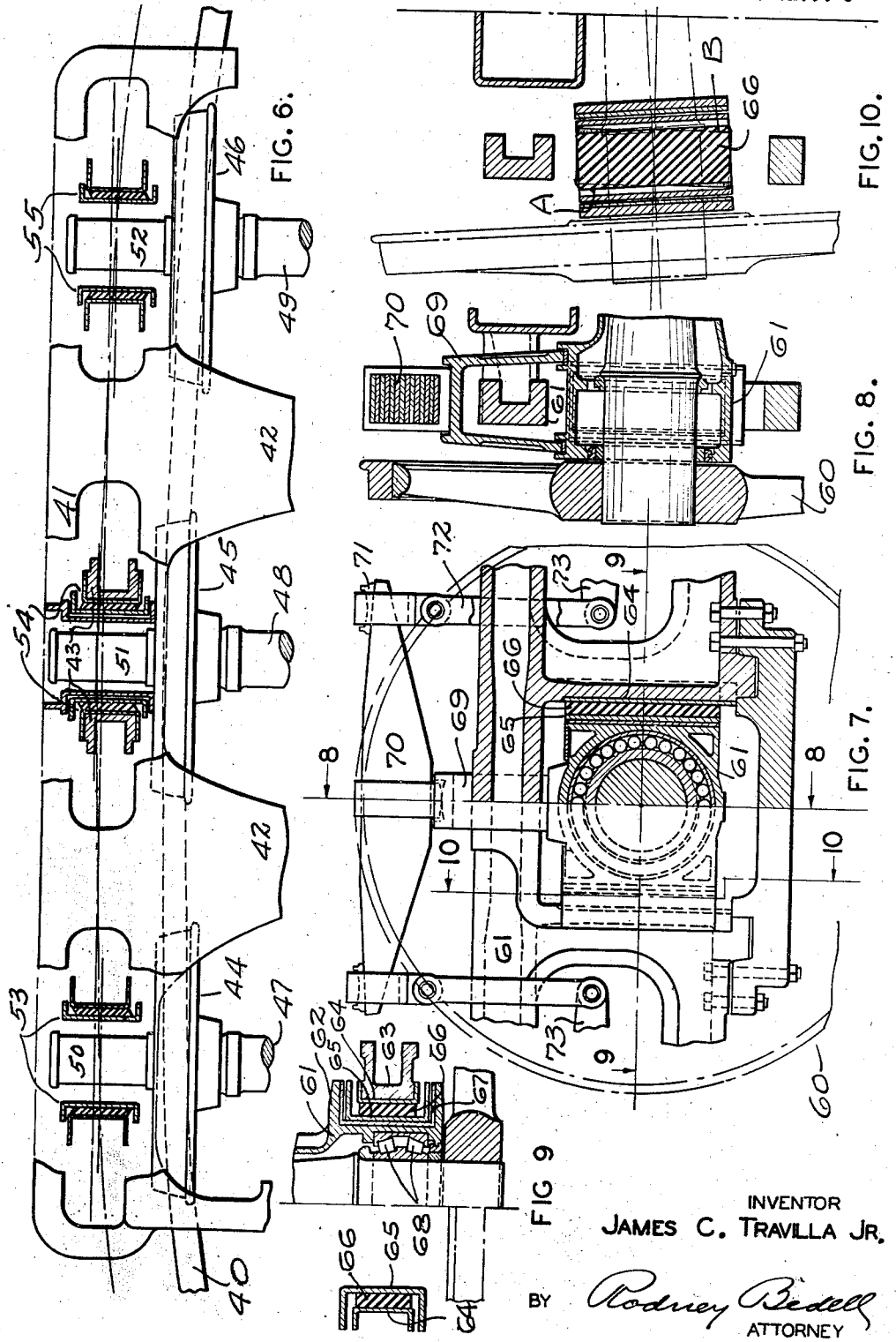
INVENTOR
JAMES C. TRAVILLA JR.
BY Rodney Bedell
ATTORNEY Patented Jan. 21, 1941

2,229,429

UNITED STATES PATENT OFFICE 2,229,429

RAILWAY TRUCK STRUCTURE

James C. Travilla, Jr., University City, Mo., assignor to General Steel Castings Corporation, Granite City, Ill., a corporation of Delaware Application October 15, 1938, Serial No. 235,142

19 Claims. (Cl. 105—222)

The invention relates to railway rolling stock and consists in novel structure whereby lateral shocks and lateral motion between the axle or journal boxes and the vehicle main frame or truck frame are controlled and cushioned so as to result in good riding qualities with minimum stresses and ample lateral flexibility for passing through curves.

Heretofore it has been the practice to provide only sufficient play between the flanges of the journal boxes and the pedestals in which they are mounted to permit the boxes to move freely in the pedestals, except where special lateral motion boxes have been used. Lateral blows or shocks, due to track irregularities and movements on curves, are transmitted directly from the box to the pedestals of the vehicle main frame or truck frame without any effective cushioning means therebetween, and such blows or shocks are finally transmitted to the vehicle body and may cause lateral movement of the frame and body. Since the axle stresses are increased by lateral shocks, they may be the cause of axle failures and they increase the wear on the wheel flanges, journals, and other parts.

When roller bearing boxes are used for locomotive driving wheels or for plural axle trucks, it is usually necessary to provide extra clearance between the box and the pedestal to allow the truck to negotiate sharp curves because there is very little, if any, play between the axle and the box when such bearings are used. It is also necessary to provide clearance for the box to tilt with the axle in a vertical plane, as some types of roller bearings do not provide for movement between axle and box in a vertical plane. This also applies to locomotive driving boxes with plain bearings.

In some instances one or more driver axles, such as the front or rear driver axles, or both, or certain axles of plural axle trucks such as the front axle of a four-wheel locomotive trailer truck or the middle axle of a six-wheel truck, have been arranged for substantial lateral motion relative to their boxes or have had lateral motion devices for supporting the frame associated with the boxes, to provide sufficient clearance between the box flanges and the pedestals to permit the truck to negotiate sharp curves.

The necessary lateral movement for any of the axles mentioned above is obtained in the present invention by the provision of a lateral motion pedestal liner unit embodying the use of rubber in shear which not only cushions the lateral blows and shocks and absorbs lateral vibrations between the journal box and pedestals and permits the liner to adjust itself to the box flanges but also provides for substantial movement between the box (and axle) and the pedestal.

It is the main object of the present invention to provide cushioning means between the boxes and pedestals of a locomotive main frame or a truck frame to control and cushion lateral blows or shocks and to accommodate relative substantial lateral movement between the axles or boxes, frame, springs, etc., without undesirable or excessive lateral play between the journal boxes and frame, and also to return the parts to normal position when they have been removed therefrom, and also to hold the boxes in proper relation to the frame when running on straight track.

Another object of the invention is to provide cushioning means between each journal box and the frame therefor so that the total amount of lateral movement be divided among all of the boxes.

Further objects of the invention are to avoid undue stresses in the axles, wheels, boxes, springs, frame, and associated parts, to avoid any undue restraint upon the relative vertical movement of the boxes and the pedestals, and of the springs and parts supported thereby, and to reduce the wear on the wheel flanges and other vehicle parts to a minimum.

These objects are attained by the structures illustrated in the accompanying drawings, in which—

Figure 6 is a top view, largely diagrammatical, of one longitudinal half of a six-wheel truck illustrating how the present invention accommodates the lateral movement of axles in opposite directions when the truck is on curved track.

Figure 7 is a view and section similar to Figure 1 but illustrating the invention embodied in a railway locomotive driver box and pedestal structure.

Figure 8 is a vertical transverse section on the line 8—8 of Figure 7.

Figure 9 is a horizontal section on the line 9—9 of Figure 7, the box and pedestal parts being omitted on the lefthand side to more clearly illustrate the shock absorbing device.

Figure 10 is a vertical transverse section taken on the line 10—10 of Figure 7 but showing the axle and wheel tilted relatively to the frame to illustrate the action of the device.

Figure 1:
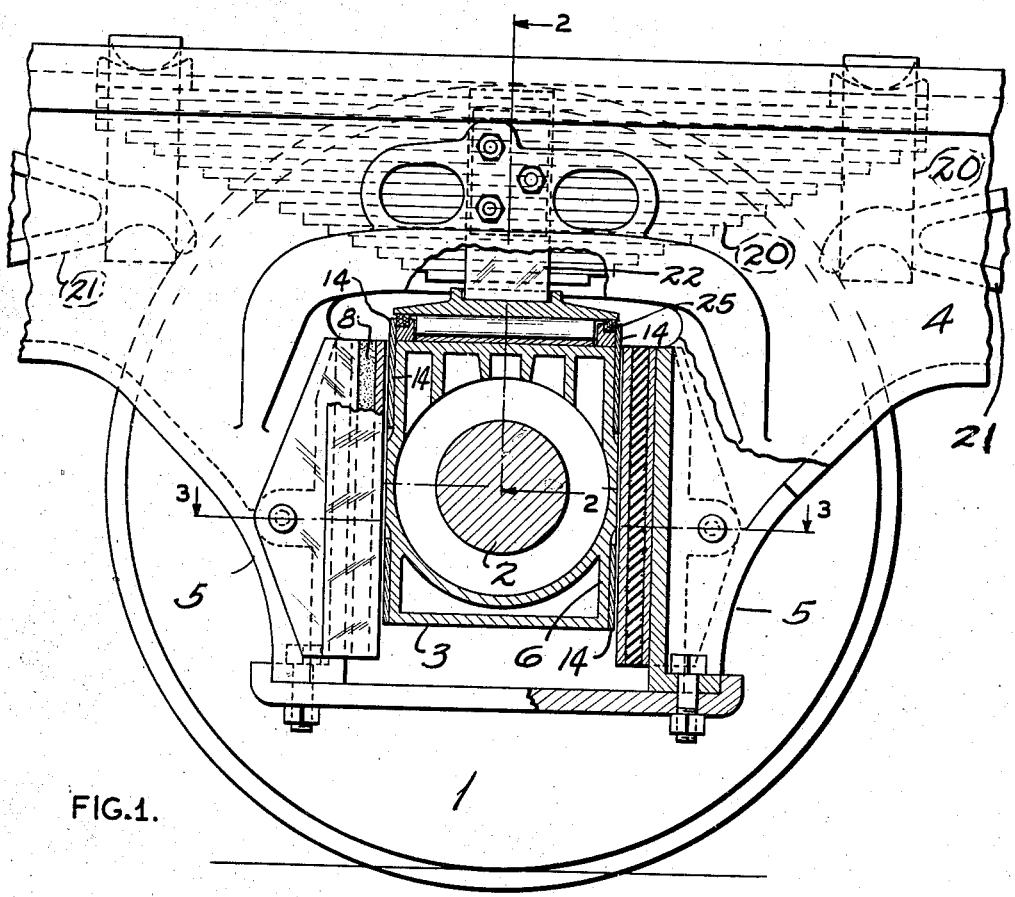
Figure 1 is a side elevation of the central wheel of a six-wheel truck including the adjacent pedestal and portion of the truck frame, a part of the pedestal, box and associated parts being sectioned longitudinally of the truck for clearer illustration.
Figure 2:
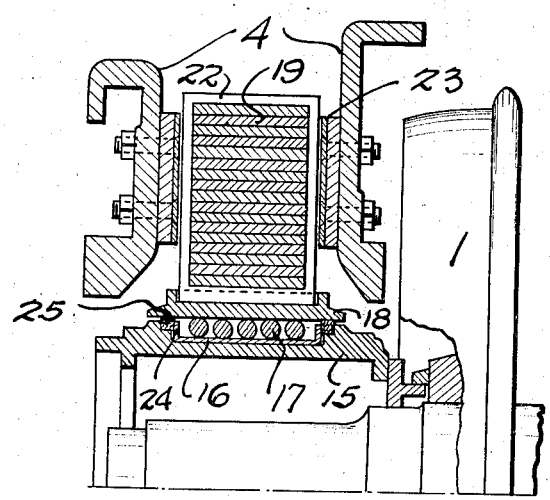
Figure 2 is a vertical transverse section taken on the line 2—2 of Figure 1.
Figure 3:
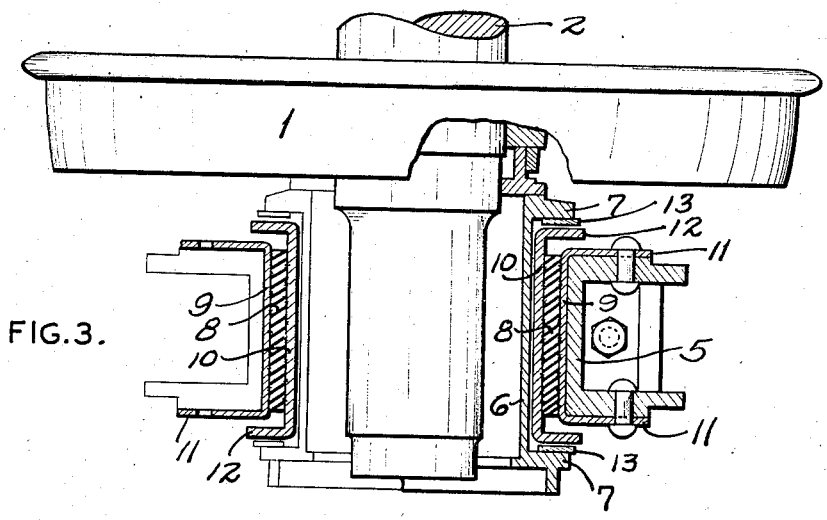
Figure 3 is a horizontal section taken on the line 3—3 of Figure 1, the box and pedestal portions on the lefthand side being indicated very lightly to accent the showing of the buffer structure between them.

The truck wheel 1 in Figures 1, 2, and 3 is fixedly mounted upon the axle 2, journaled in box 3 in the usual manner. The truck frame includes side members or wheel pieces 4 having inner and outer vertical walls, there being pedestal structure formed integral therewith and including the spaced legs 5 depending at the sides of box 3. Each side wall 6 of box 3 extends inwardly and outwardly beyond the inner and outer faces of pedestal legs 5 and is provided with flanges 7 extending longitudinally of the truck and spaced from the inner and outer faces of pedestal leg 5.

A yielding structure is positioned between each pedestal leg and the adjacent journal box wall and preferably this structure comprises a rubber pad 8 with a metal plate 9 bonded to one of its faces and a metal plate 10 bonded to its other face. In referring to "rubber" throughout this application is meant a resilient substance which may be either of natural rubber or a substitute such as the artificial rubber now on the market, or other rubber-like material. One of the plates, here shown as the plate 9, is secured to the pedestal leg by having its edges bent over the side faces of the pedestal leg, as at 11, and riveted, bolted, or welded thereto. Plate 10 has its edges flanged in the same direction at 12 and opposing, but fitting between, box flanges 7. Preferably renewable wear plates 13 are applied to the box flanges to make it possible to maintain the desired fit between the flanges 12 and the box without renewing the box. For similar reasons, wear plates 14 are provided on the box side walls 6 to receive the thrust from the opposing faces of buffer plates 10.

Upon relative lateral movement of the box and pedestal, the flanges 7 and 12 either at the inner or outer end of the box will abut, through wear plates 13, and place shearing stresses upon the rubber pads which will yieldingly resist the relative movement of the box and pedestal and, when the thrust has terminated, will tend to return the box and pedestal to their normal position. It will be noted that the flanges 7 of the boxes and corresponding flanges 12 of plate 10 are spaced sufficient distances from the sides of the pedestal and bent legs of plate 9 to provide for distortion laterally of the rubber pads 8 when under shear so as to allow substantial relative lateral movement of the box and pedestal. Normally sufficient clearance or play is provided between flanges 12 and the adjacent box flanges, or wear plates 13, and between plate 10 and the adjacent box side wall 6 to facilitate free vertical sliding movement of the box and pedestal and to avoid initial compression of rubber pad 8 although, obviously, slight relative movement of the box and pedestal legs longitudinally of the truck will be yieldingly absorbed by the direct compression of the rubber pads. While plate 12 is flanged at inside and outside, it might be flanged at only the inside or the outside to take thrust in one direction only.

The top wall 15 of the journal box is recessed and provided with a renewable seat member 16 mounting a plurality of rollers 17 which carry a saddle 18 mounting the leaf spring 19, from the ends of which depend links 20 suspending equalizers 21 which will be pivoted to the truck frame intermediate their ends in a manner not shown on the drawings but obvious to those familiar with the art. A spring band 22 surrounds the central portion of the leaf spring and the inner and outer walls of the frame wheel piece 4 are provided with renewable chafing plates 23 for maintaining a close sliding fit between the wheel piece and the spring.

The above described mounting of the spring accommodates movement of the box relative to the spring and frame and transversely of the truck without placing any transverse stress upon the spring or its band 22 or its equalizer links 20. The inner and outer ends of plate 16 are flanged upwardly, as indicated at 24, to limit the movement of rollers 17. The top face of the journal box is grooved to receive felt-like elements 25 serving to exclude dirt from the rollers.

Figure 4:
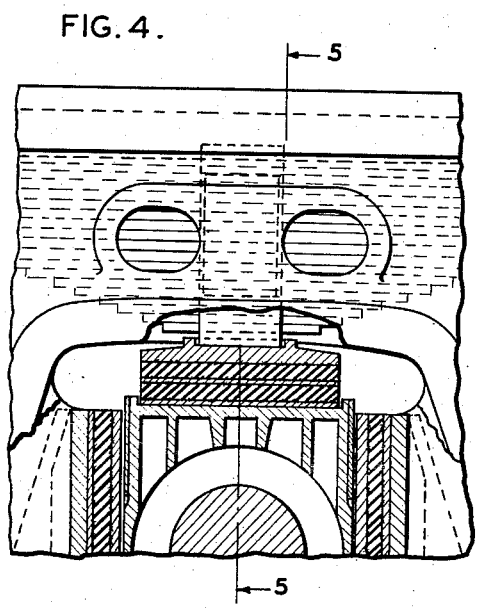
Figure 4 is a detail corresponding to the central upper portion of Figure 1 but illustrating another form of the invention.
Figure 5:
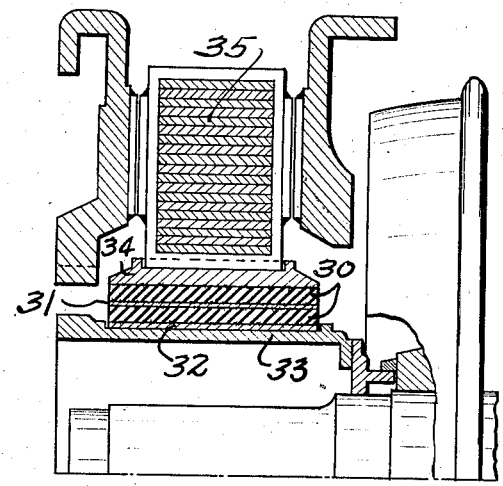
Figure 5 is a transverse vertical section taken on the line 5—5 of Figure 4.

Another method of mounting the truck spring to accommodate the relative lateral movement of the same and the journal box is illustrated in Figures 4 and 5 where a pair of rubber pads 30 are bonded to an intermediate plate 31, the lower pad being bonded to a plate 32 mounted on the top wall 33 of the journal box, and the upper pad being bonded to a saddle member 34 carrying the truck spring 35 similarly to the saddle 18 previously described. In other respects the structure shown in Figures 4 and 5 corresponds to that shown in Figures 1, 2, and 3.

The rubber pads 30 will distort laterally under shear during relative lateral movement of the journal box and frame while the spring 35 will abut against either the outer or inner walls of the wheel pieces. The resistance, however, against lateral distortion will be less than the resistance of the rubber pads 8 between the pedestal liner plates 9 and 10 because the lateral movement will be about one-half the amount per rubber pad. A further object of using two rubber pads 30 under the spring 35 instead of one pad is to provide a resilient mounting which will withstand the vertical load carried upon it without excessive bulging or distortion while under compression.

In both constructions the spring or equalizer may remain in a definite position transversely of the truck so as not to be subjected to any undesirable transverse stresses, and so as not to disturb or affect the action of the equalizing system of the truck.

The lateral movement of the box and pedestal is sufficient to accommodate the necessary play between these parts under any condition for which the construction is designed and at the same time it is controlled and dampened so that no undesirable shocks will be transferred to the frame, and so that the boxes will be held in proper relation to the frame when running on straight track. The rubber pads between the pedestal legs and the boxes are free from compression laterally of the truck but are utilized in shear to resist excessive lateral movements between the box and pedestal and to return the same to their normal position.

The desired results may be attained by securing the buffer unit to the box wall instead of to the pedestal wall and, if desired, the rubber pad could be bonded directly to the pedestal wall or to the box wall instead of utilizing the intermediate plate. However, the structure described is well adapted for the manufacture of a separate unit, as best illustrated in heavy lines at the lefthand side of Figure 3, and obviates the necessity of handling the relatively large box or heavy frame in the bonding operation. It will be understood that although the yielding structure between the pedestals and box side wall cooperates with the yielding mounting of the truck springs to effect a desirable result, it would be practical to use either one of these yielding arrangements irrespective of the use of the other.

Figure 6 illustrates the particularly advantageous results attending the use of the present invention on a six-wheel truck as the latter enters curved track. One rail head is indicated at 40. The wheel piece of the rigid frame is indicated at 41, and its transverse transoms at 42. One pair of depending pedestal legs 43 and their liner units and a portion of the journal box are sectioned. The wheels are shown at 44, 45, and 46 mounted on axles 47, 48, and 49 having journals 50, 51, and 52. The three sets of liner structures are indicated at 53, 54, and 55, respectively. The yielding liner structure permits the box for the central journal 51 to move outwardly relative to the pedestal legs, and the boxes for the end journals 50 and 52 to move inwardly relative to the pedestal legs thereby permitting wheel 45 to be disaligned with wheels 44 and 46 and accommodate the movement of the truck around the curved track. Hence the yielding of the rubber elements in opposite directions, when such structure is applied to each pedestal of a series, reduces by fifty per cent the lateral clearance necessary between the box flanges and pedestals as compared to that necessary in the ordinary arrangement which provides for lateral motion boxes in certain pedestals of a series and non-lateral motion boxes in the remainder of the pedestals.

At the same time all the boxes are held (yieldingly) in alinement as is desirable on straight track and there is no excessive play of one or more axles as is present in some installations where the necessary play is obtained by merely providing wide spaces between the box flanges and the pedestal without any means for restricting the play where it is not required to accommodate curved track or heavy lateral thrusts from other causes.

Figures 7 to 10 illustrate the invention utilized in association with locomotive driving wheel 60 and its axle box 61, having flanges 62 embracing the locomotive frame pedestal leg 63 but spaced substantially therefrom to accommodate between them the liner device comprising the inner plate 64, the outer plate 65, and the rubber pad 66 bonded to the portions of plates 64 and 65 extending transversely of the frame with the flanges of plates 64 and 65 spaced a substantial distance from each other. The box is provided with an additional inside wear plate 67 which may be replaced when reduced in thickness to a degree which results in undesirable play between the box and the pedestal.

The box shown is of the roller bearing type with the rollers 68 inclined to transmit lateral forces. This arrangement permits very little play between the box and journal longitudinally of the axle. The spring saddle 69 is mounted on the box (see Figure 8), and the saddle and its spring 70 may move with the box transversely of the frame 61 instead of moving transversely of the box as does the structure described above, the necessary transverse movement of the box, saddle, and spring relative to the frame and pedestal being accommodated by the lateral swing of the comparatively long hangers 72 which connect the ends of the spring 70 to the ends of the equalizers 73 in the usual manner. The rubber pad liner structure accommodates the relative lateral movement of the frame and the box, and parts movable therewith corresponding to the similar function of the liner structures previously described.

Figure 10 illustrates the manner in which this liner structure also accommodates tilting of the axle in a vertical plane relative to the frame. Pad 66 not only accommodates movement of its opposite faces laterally in opposite directions but permits them to twist about a horizontal axis extending longitudinally of the vehicle whereby the contour of one face will correspond to the line A bounding the sectioned area, and the other face as defined by the line B may remain upright to correspond to the adjacent face of the frame pedestal leg 63. It will be understood that the rubber pads between the truck boxes and their pedestal legs may twist also to accommodate angular tilting of the wheels and axles relative to the truck frame.

This function of the pads also tends to maintain a bearing between the box and the liner throughout the full length of the liner and prevent the pinching of its upper or lower corner (according to the direction of inclination of the axle) and hence the box slides more freely in the pedestal and equalization of the spring system is improved. There is no tilting of the box on the axle longitudinally of the axle and it is necessary to taper outwardly the surfaces of box flanges adjacent to the pedestal or liner side faces from a point intermediate the top and bottom portions of the flanges as in the usual driving box structure, or to provide extra clearance between box and pedestal, or to provide special arrangement of box with flanged portions carried on trunnions.

In each of the constructions shown in the drawings the center of the applied lateral force is in alignment with that face of the rubber pad nearest the pedestal leg. This center of force also extends substantially through the center of the box flange and the flange on the liner which engages the box flange. This location of the center of the applied lateral force will keep the inner and outer plates of the liner parallel to each other when the forces are applied while any other location of the center of the lateral force would tend to swing the outer plate in a horizontal plane and thereby pinch the box.

With this structure, as in the truck liner structure previously described, the rubber pads act to dampen oscillations as well as to yieldingly resist relative movement of the parts and return them to their normal position, whereas the usual lateral motion box arrangements rely upon springs or gravity to return the box to normal position and in such arrangements forces tending to produce relative lateral movement are stored up in the lateral motion device and not dissipated.

The construction may be varied in other ways than those described above and the exclusive use of all modifications coming within the scope of the claims is contemplated.

What is claimed is:

1. In combination, a railway vehicle wheeled axle, an axle box with a flanged side wall extending transversely of the vehicle, a frame including a pedestal in which said box plays for a substantial distance transversely of the vehicle, a rubber pad extending across the face of a leg of said pedestal and having one side fixed relative thereto, a metal plate secured to the other side of said pad with a flange spaced from the side of said pedestal leg and opposing the adjacent wall and flange of said box whereby maximum movement of said box transversely of the vehicle relative to said pedestal is determined by contact of said leg and said plate flange and is yieldingly resisted by the shear value of said pad.

2. A lateral motion device for insertion between the wall of a railway axle box and an adjacent pedestal leg comprising a rubber pad corresponding in size and shape to the transverse face of the pedestal, and plates bonded to opposite sides of said pad, one of said plates being constructed and arranged to be applied to the face of a pedestal leg and flanged to overlie the front and rear faces of the pedestal leg and the other of said plates being constructed and arranged to extend alongside of the side wall of the box and flanged to oppose flanged structure extending outwardly from the box side wall, there being an unobstructed space between the adjacent respective flanges on said plates whereby relative movement of said plates parallel to said pad sides will be resisted by the shear value of the rubber in said pad without compressing the pad.

3. In combination, a railway vehicle wheeled axle, an axle box thereon, rollers mounted on top of said box with their axes extending longitudinally of the vehicle, a frame supporting member mounted on said rollers, there being flat bearings on said box and member for said rollers to avoid resistance to the rolling movement of said rollers transversely of the truck, a frame carried on said member and movable therewith transversely of the vehicle relative to said box through the rolling movement of said rollers, there being rubber means between said box and said frame member placed in shear only to yieldingly resist their relative lateral bodily movement and tending to return them to normal position when such movement has occurred.

4. In a railway vehicle, a wheeled axle, a journal box thereon, a frame with a pedestal receiving said journal box and movable vertically thereon, an element carried by said box and supporting said frame, a rubber pad arranged between upright walls of said box and pedestal with one face secured to one of said walls, a member secured to the other face of said rubber pad and slidable vertically along the other of said walls, said pad terminating transversely of the vehicle substantially at the edges of the narrower of said walls, there being respective elements on said member and latter-mentioned wall opposing each other transversely of the truck but normally having a substantial clear space between them whereby relative movement of said box and pedestal transversely of the frame is yieldingly resisted by the shear value of said rubber pad while their relative vertical movement is permitted, there being mounting structure between said box and said frame-supporting element accommodating relative movement of the same transversely of said frame.

5. In combination, a railway vehicle wheeled axle, an axle box thereon, a frame with a pedestal receiving said box, a pedestal liner comprising inner and outer plates with a rubber pad between the plate surfaces which extend transversely of the vehicle, said inner plate having a flange opposing a portion of said box facing transversely of the vehicle and said outer plate having a flange opposing a portion of said frame facing in the opposite transverse direction, there being a substantial unobstructed space between said flanges whereby when the axle and box tilt relative to the frame said flanges may maintain contact throughout their length with the corresponding box and frame faces because of the twisting of said pad.

6. In combination, a railway vehicle, a wheeled axle, an axle box thereon, a frame with a pedestal receiving said box and providing for substantial lateral movement of said box in said frame, a rubber pad having opposite faces directed longitudinally of the vehicle and with one of said faces fixed relative to a leg of said pedestal, a metal member secured to the other of said faces, said box and member being slidable vertically on each other to limit their relative movement, and said member and pedestal leg having parts opposing each other transversely of the vehicle, independently of said pad, whereby relative bodily movement of said box and pedestal transversely of the vehicle prior to contact of said parts will be resisted by the shear value of said pad without directly compressing any part of said pad between said parts.

7. In a railway vehicle, a wheeled axle, an axle box with a side wall having a flange extending longitudinally of the vehicle, a frame pedestal with a wall opposing and spaced from said box wall and with an element opposing and substantially spaced from said flange, and a rubber pad between said walls with its width transversely of the vehicle substantially exceeding its thickness longitudinally of the vehicle, said pad being movable as a unit with one of said walls vertically relative to the other of said walls and with its edge adjacent to said flange spaced substantially therefrom and with its opposite faces secured respectively against substantial movement transversely of the vehicle relative to said box and pedestal walls, whereby substantial movement of said box transversely of the vehicle relative to said pedestal is yieldingly resisted by the shear value of said pad before such movement is positively limited by the abutment of said flange and element with each other and without compressing said pad.

8. In a railway plural-axle truck, a pedestal, a journal box having substantial play vertically and transversely of the truck in said pedestal, said pedestal having a wall opposing and spaced substantially from a side wall of said box extending transversely of the truck, and said box wall having a flange opposing and spaced substantially from an opposing element at the edge of said pedestal wall, there being a wide slab of rubber extending across said pedestal wall and terminating abreast of said element and being relatively thin with its opposite faces respectively secured against substantial movement transversely of the truck relative to said walls, said pad being free to move vertically relative to one of the adjacent walls and, said pad being subject to distortion between its faces to accommodate substantial relative movement of said box and pedestal transversely of the truck when the truck is traveling on curved track.

9. In a railway vehicle, a wheeled axle, a journal box thereon, a frame with a pedestal receiving said journal box and movable vertically thereon, upright members opposing each other and extending transversely of the vehicle between said box and pedestal, one of said members being narrower than the other, a rubber pad between said members, means securing one face of said pad against substantial movement transversely of the vehicle relative to one of said members, means securing the other face of said pad against substantial movement transversely of the vehicle relative to the other of said members, at least one of said means providing for relative vertical movement of said pad and an adjacent member, said pad terminating substantially at the edges of the narrower of said members, there being respective elements on said box and pedestal opposing each other transversely of the vehicle but normally having a substantial clear space between them, whereby substantial relative movement of said box and pedestal transversely of the vehicle is yieldingly resisted by the shear value of said rubber pad while relative vertical movement of said box and pedestal is accommodated without resistance from said rubber pad.

10. A structure as described in claim 9 in which one of the pad-securing means comprises a plate bonded to a pad face and slidable vertically on the adjacent member.

11. A structure as described in claim 9 in which one of the pad-securing means comprises a plate bonded to a pad face and affixed to the adjacent member, and the other pad-securing means comprises a plate bonded to the other pad face and slidable vertically on the other member.

12. In combination, a railway vehicle wheeled axle, an axle box with a side wall having a flange extending longitudinally of the vehicle, a frame member having a wall opposite but spaced from said box wall and having another element opposite but normally spaced from said flange, a rubber pad located only between said box wall and the opposing member wall, said pad being movable with one of said walls vertically relative to the other of said walls, means for holding the face of said pad adjacent said member wall with the latter and for holding the face adjacent said box wall with the same during relative lateral movement of said box and member, due to lateral forces acting between said box and member, whereby the opposite faces of said pad move parallel to each other, said box flange extending longitudinally of the vehicle substantially equal distances on each side of a point in transverse alignment with the face of said pad adjacent said member wall.

13. In combination, a railway vehicle wheeled axle, an axle box with a side wall having spaced flanges extending longitudinally of the vehicle, a frame member having a wall opposite but spaced from said box wall and having other elements opposite but normally spaced from said flanges, a rubber pad located only between the box side wall and the opposing member wall, said pad being movable with one of said walls vertically relative to the other of said walls, means for holding the face of said pad adjacent said member wall with the latter and for holding the face of said pad adjacent said box wall with the same during relative lateral movement of said box and member due to lateral forces acting between said box and member, whereby the opposite faces of said pad move parallel to each other, said box flanges extending longitudinally of the vehicle substantially equal distances on each side of a point in transverse alignment with the face of said pad adjacent said member wall.

14. A structure as described in claim 13 in which the means for holding the faces of said pad comprise plates bonded thereto and shaped to engage the box and frame member respectively.

15. In a railway vehicle, a wheeled axle, a journal box thereon, a frame with a pedestal receiving said journal box and movable vertically thereon, a rubber pad arranged between the adjacent upright side walls of said box and pedestal and having one of its faces secured to one of said walls, a member secured to the other face of said pad and slidable vertically along the other of said walls, said pad terminating substantially at the edges of the wall to which it is secured, there being respective elements on said member and the other of said walls opposing each other transversely of the truck but normally having a substantial clear space between them whereby relative movement of said box and pedestal transversely of the frame is yieldingly resisted by the shear value of said rubber pad.

16. In combination in a railway vehicle, at least three wheeled axles, journal boxes on said axles, a rigid frame mounted on said journal boxes, the frame and the adjacent boxes on at least one of said axles having pairs of adjacent members extending transversely of the vehicle and spaced from each other, and rubber pads of solid cross section between the members of each pair, the opposite faces of each pad being secured against substantial movement transversely of the vehicle relative to the corresponding box and frame members respectively, the edges of the pad facing transversely of the vehicle being unconfined, said box and frame members, with the corresponding face portions of said pads, having relative movement transversely of the vehicle to accommodate substantial movement of the corresponding box and axle relative to the frame when the truck is on curved track but such movement being restrained by the resistance of said pads to shear.

17. In a railway vehicle truck of the class described, a wheeled axle, a journal box thereon, a saddle on said box, a spring on said saddle, a frame supported by said spring and including a wheel piece with parts at the side of said spring to engage the latter and move the same with said frame transversely of said box, said saddle including a rubber pad of solid cross section, the upper and lower faces of which may be moved relative to each other transversely of the vehicle thereby subjecting the body of the pad to shear and accommodating substantial movement of said box transversely of said wheel piece and spring to adapt the axle journaled in said box and its wheels to move laterally of the vehicle relative to the other axles of the truck when the vehicle is on curved track.

18. In combination, a railway vehicle wheeled axle, an axle box on said axle, a relatively wide rubber pad secured to the top wall of said axle box with its edges facing longitudinally of the axle being substantially free of restraint by said box, a plate secured to the top face of said pad and movable longitudinally of the axle over the box, a second relatively wide rubber pad secured to the upper face of said plate and movable therewith longitudinally of the axle, a spring supporting member secured to the upper face of said second-mentioned pad and movable therewith longitudinally of the axle, a spring carried on said member, a vehicle frame supported on said spring and movable transversely of its length relative to said box and axle for a substantial distance subject only to the resistance of said pads to shearing forces applied horizontally transversely of the vehicle, whereby the structure yieldingly accommodates substantial relative movement of the axle with its wheel and box transversely of the frame on curved track.

19. In combination, a railway vehicle wheeled axle, an axle box on said axle, a plurality of relatively wide flat rubber pads carried on the top wall of said axle box one above the other, there being a relatively thin metal plate between and secured to the opposing faces of adjacent pads and movable therewith longitudinally of the axle over the box, the edges of said pads and plates facing longitudinally of the axle being substantially free of restraint by said box, a spring supporting member secured to the top of the uppermost of said pads, a spring carried on said member, a vehicle frame supported on said spring and movable transversely of its length relative to said box and axle for a substantial distance subject only to the resistance of said pads to shearing forces applied horizontally transversely of the vehicle, whereby the structure yieldingly accommodates substantial relative movement of the axle with its wheel and box transversely of the frame on curved track.

JAMES C. TRAVILLA, Jr.